(12) United States Patent
Husband et al.

(10) Patent No.: US 7,987,867 B2
(45) Date of Patent: Aug. 2, 2011

(54) BURST DISC ARRANGEMENT AND A METHOD FOR REPLACING A BURST DISC IN A BURST DISC ARRANGEMENT

(75) Inventors: Trevor Bryan Husband, Banbury (GB); Philip Alan Charles Walton, Oxon (GB)

(73) Assignee: Siemens Plc, Frimley, Camberley, Surrey (GB)

( * ) Notice: Subject to any disclaimer, the term of this patent is extended or adjusted under 35 U.S.C. 154(b) by 715 days.

(21) Appl. No.: 12/048,870

(22) Filed: Mar. 14, 2008

(65) Prior Publication Data

US 2008/0236673 A1 Oct. 2, 2008

(30) Foreign Application Priority Data

Mar. 29, 2007 (GB) .................................. 0706035.3

(51) Int. Cl.
*F16K 17/40* (2006.01)
(52) U.S. Cl. .............. 137/15.18; 137/68.18; 137/68.23; 137/315.11; 62/51.1
(58) Field of Classification Search .............. 137/15.17, 137/15.18, 15.19, 68.18, 68.19, 68.23, 68.28, 137/315.04, 315.11; 220/89.2; 65/51.1
See application file for complete search history.

(56) References Cited

U.S. PATENT DOCUMENTS

| | | | | |
|---|---|---|---|---|
| 3,327,894 A | * | 6/1967 | Ferris | 220/89.2 |
| 4,033,140 A | * | 7/1977 | Klee et al. | 62/51.1 |
| 4,102,469 A | * | 7/1978 | Shegrud et al. | 220/89.2 |
| 4,263,929 A | * | 4/1981 | Kearney | 137/68.18 |
| 4,342,988 A | * | 8/1982 | Thompson et al. | 137/68.18 |
| 4,505,289 A | * | 3/1985 | Wilson | 137/315.11 |
| 4,978,947 A | * | 12/1990 | Finnegan | 137/68.18 |
| 5,050,630 A | | 9/1991 | Farwell et al. | |
| 5,155,471 A | * | 10/1992 | Ellis et al. | 137/68.18 |
| 5,291,739 A | * | 3/1994 | Woods et al. | 62/51.1 |
| 6,109,042 A | | 8/2000 | Woods et al. | |
| 6,591,854 B1 | * | 7/2003 | Turner et al. | 62/51.1 |
| 2003/0127132 A1 | | 7/2003 | Turner et al. | |
| 2005/0088266 A1 | | 4/2005 | Mangano et al. | |
| 2005/0198973 A1 | | 9/2005 | Clarke | |

FOREIGN PATENT DOCUMENTS

| | | |
|---|---|---|
| EP | 0 065 050 A1 | 11/1982 |
| GB | 782360 | 2/1954 |
| GB | 1196091 | 6/1970 |

OTHER PUBLICATIONS

United Kingdom Search Report dated Jul. 23, 2007 (Three (3) pages).

* cited by examiner

*Primary Examiner* — John Rivell
(74) *Attorney, Agent, or Firm* — Crowell & Moring LLP

(57) ABSTRACT

A burst disc arrangement for a cryostat comprising a replaceable burst disc (52) held in compression between a high-pressure flange formed at an end of a high-pressure conduit (12), and a low-pressure flange (60) formed at an end of a low-pressure conduit (14). In particular, the burst disc arrangement further comprises: a housing (50) enclosing the high- and low-pressure flanges; and compression means (56), distributed around the housing (50) and being arranged to bear upon the one of the flanges (60), so as to urge it towards the other flange, thereby retaining the burst disc (52) in compression between the flanges. The housing (50) includes a first opening (20) large enough to allow the replaceable burst disc (52) to pass therethrough.

17 Claims, 4 Drawing Sheets

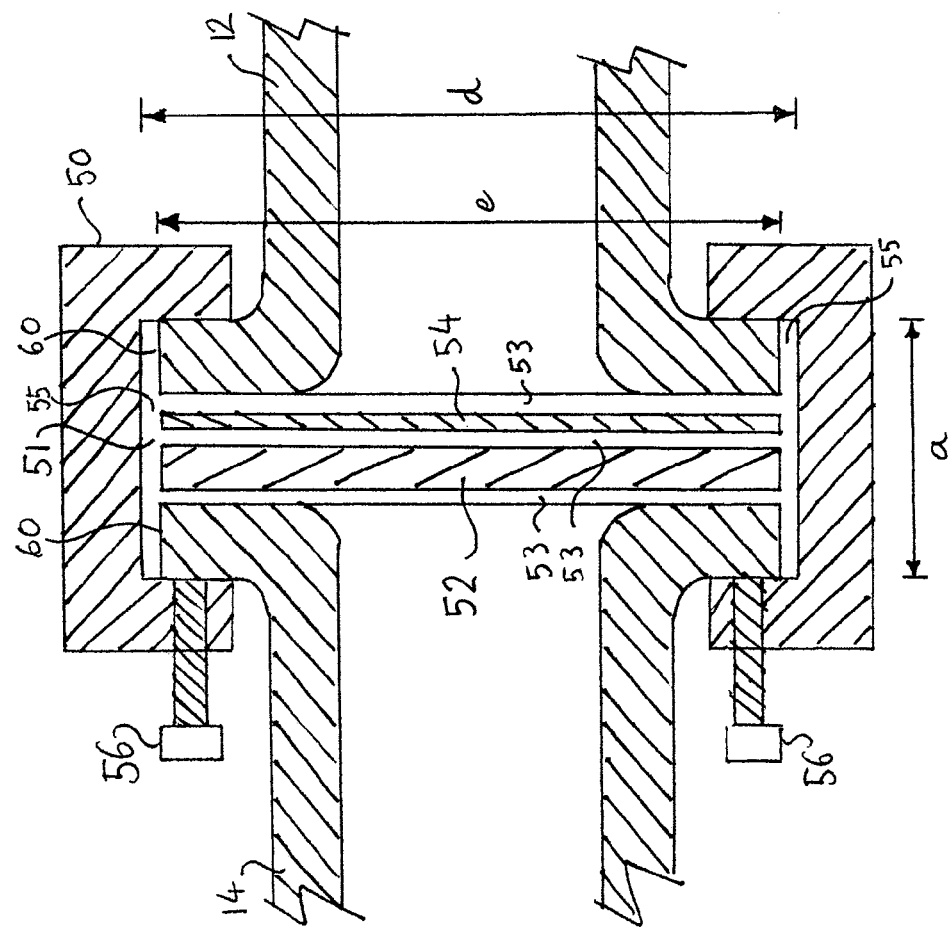

BURST DISC ARRANGEMENT AND A METHOD FOR REPLACING A BURST DISC IN A BURST DISC ARRANGEMENT

As is well known in the art, superconducting magnets are typically cooled by a liquid cryogen, such as liquid helium, within a cryostat. Superconducting magnets are also susceptible to quench events, in which, for one of a number of reasons, part of the superconducting magnet ceases to be superconducting. The resulting resistance in part of the magnet causes heat due to the current flowing through it. This rapidly causes further parts of the superconducting magnet to cease superconducting. The result is that all of the energy which was stored in the magnetic field of the magnet is suddenly released as heat. In a superconducting magnet cooled by a liquid cryogen, this typically results in rapid boiloff of a large volume of the cryogen, with gaseous and liquid cryogen being expelled from the cryostat at high speed.

During a quench, it is essential that the escaping cryogen gas is allowed to exit the cryostat in a safe manner into an associated conduit, and be routed safely out of the building housing the magnet.

The exit point from the cryostat must allow the gas to exit with the minimum of restriction, yet the exit point from the cryostat must remain leak tight until the point of failure i.e. quench. The exit point typically opens by responding to an increase in the pressure within the cryostat.

Currently, it is known to provide a re-sealable quench valve to control the exit point. The quench valve is closed until a certain pressure is reached within the cryostat. Once the cryostat pressure reaches the certain value, the quench valve is opened by the pressure acting upon it. Once the quench event is over, the quench valve will reseal itself, and should be undamaged. In such arrangements, however, the valve mechanism is directly in the exit flow path, which reduces the available cross sectional area for the gas flow, which in turn increases the cryostat pressure during a quench This has a direct relationship on the design of the helium vessel.

PRIOR ART

U.S. Pat. No. 6,109,042 describes a cryostat pressure relieving venting system for a superconducting magnet which includes a cryogen gas vent assembly with burst disc assembly that includes burst disc, gasket, collars and bolt assemblies, and unitary subassembly. The subject matter of this patent differs from the present invention at least in that it uses standard pipe flanges to hold the burst disc into position. It also requires the bolts to be fully removed to be able to extract the broken disc.

United States patent application 2003127132-A1 describes a burst disc assembly for superconducting magnets, which has a securing unit to apply constant pressure to press the burst disc and a capture flange toward each other. The disc opens an exit path when pressure is above a predetermined value in the cryostat. The subject matter of this patent differs from the present invention at least in that it uses a metal ring around a graphite burst disc for location of the burst disc between two flanges which are bolted together. Such arrangement requires the two flanges to be completely separated, by removing the bolts completely, before the disc can be replaced.

United States patent application 2005088266-A1 describes a zero backflow vent assembly for an MRI superconducting magnet which provides valve opening when undesired pressure builds up in a helium pressure vessel and valve closing when the pressure inside the vessel is subsided to safe levels. The subject matter of this patent differs from the present invention at least in that it describes the integration of a burst disc with a quench valve.

United States patent application 2005198973-A1 describes a magnet vent assembly for magnetic resonance imaging system, having two valves configured to enable the direction of the flow path of cryogenic gas from magnet exhaust through one of two burst discs. The subject matter of this patent differs from the present invention at least in that it uses two burst discs in parallel, and the flow path is diverted manually after a quench. The disc can then be exchanged.

United Kingdom patent GB1196091 and U.S. Pat. No. 5,050,630 each proposes a burst disc arrangement in which a burst disc is compressed between two flanges by a clamp ring.

Other known solutions include single and multiple burst discs. Burst discs are frangible seals which close an exit path from the cryostat, in normal circumstances. They are typically of thin, circular shape, although the term "burst disc" as used herein applies to such frangible seals of any appropriate shape. During a quench event, the pressure within the cryostat rises to such a level that the burst disc ruptures, opening an exit path for boiled off cryogen to escape from the cryostat. Such known burst disc solutions typically involve a replaceable burst disc held in compression between a high-pressure flange formed at an end of a high-pressure conduit which leads to the cryostat, and a low-pressure flange formed at an end of a low-pressure conduit which forms part of an exit passageway providing a safe path for evacuation of expelled cryogen from the cryostat. Following rupture of the burst disc, it is necessary to disassemble the joint between the flanges in order to extract the remains of the shattered burst disc, and fit a new one. This is time consuming and difficult because the current solution requires removal of all nuts and bolts as well as separation of the flanges. The current solution introduces a significant delay into recommissioning apparatus such as a magnetic resonance imaging system following a quench. Such delays will not be welcomed by an end user, who will already have suffered loss of use of its system due to the quench. Systems such as magnetic resonance imaging apparatus are typically heavily used, and any loss of use may mean that valuable medical data will not be able to be collected, possibly to the physical detriment of a patient.

The present invention accordingly provides improved methods and apparatus for controlling exit paths from the cryostat, which alleviate some of the inconveniences of the prior art. The present invention employs disposable burst discs, which do not require a valve mechanism positioned in the exit flow path. Furthermore, the present invention provides an arrangement which allows quick and easy exchange of the burst disc, for example after it has ruptured. This ensures that a large exit path is available for the escaping cryogen gas.

The present invention requires only slackening off of fixing screws, not their complete removal, in order to replace a ruptured burst disc. The remains of the ruptured burst disc can then be extracted and a new burst disc fitted. This solution only requires a small lateral movement of the flanges (2-3 mm) and not complete separation in order to carry out this operation.

A hitherto largely unregarded drawback of the known solutions lies in that a compressor, for example a helium compressor where helium is used as the refrigerant, continues to operate despite a quench event taking place, and a burst disc rupturing or a quench valve opening. This has the significant drawback that the refrigerator continues to cool the radiation shield. Once the quench event has expelled as much cryogen as it will and the refrigerator is still operating, the pressure within the cryostat may fall below atmospheric pressure, drawing air into the cryostat. This is very problematic, as air may freeze inside the cryostat. Once air has frozen inside the cryostat, it can only be removed by raising the temperature of the whole system high enough for the air to turn back into gas. The magnet and the cryostat will then need to be cooled back to operating temperature, which will introduce significant delays, and may consume significant quantities of expensive cryogen. An aspect of the present invention provides a sensor, arranged to detect the bursting of the burst disc, or other operation indicating the opening of an exit path from the cryostat, and in response to such detection, stopping the compressor and refrigerator. This will allow remaining cryogen within the cryostat to continue to boil off through the exit path, reducing the likelihood of air ingress into the cryostat.

Certain embodiments of the present invention accordingly provide the addition of a sensor on one side of the burst disc. This sensor is typically an electrical sensor of the on/off variety, which is in a first state on installation and during normal operation of the magnet, but which changes to a second, opposite, state in response to the bursting of the burst disc. The provision of such a sensor provides at least the following advantages: the sensor may be used to turn off a helium compressor which operates the refrigerator. Any remaining helium in the system will slowly boil off, thus keeping the pressure inside the vessel above atmosphere, and reducing the chance of air ingress. The sensor can also be linked to an alarm system, which may indicate the rupture of the burst disc to the user or a service organisation.

In particular, the present invention provides methods and apparatus as defined in the appended claims.

The above, and further, objects, characteristics and advantages of the present invention will now be described in relation to a certain number of embodiments, given by way of examples only, in conjunction with the appended drawings in which:

FIG. 1A shows a cross section to the features of FIG. 1, taken through a plane which does not intersect opening 20.

The present invention provides a mounting arrangement for a burst disc which allows easy access and rapid, simplified exchange of a burst disc. Preferably, the present invention allows replacement of the burst disc without the need to fully remove any of the associated securing fasteners.

In certain preferred embodiments, the present invention employs a burst disc sensor to control an associated compressor, such that operation of the compressor is stopped in response to the rupturing of the burst disc, which prevents the pressure within the cryostat from going sub-atmospheric after a quench event.

Figure 1:
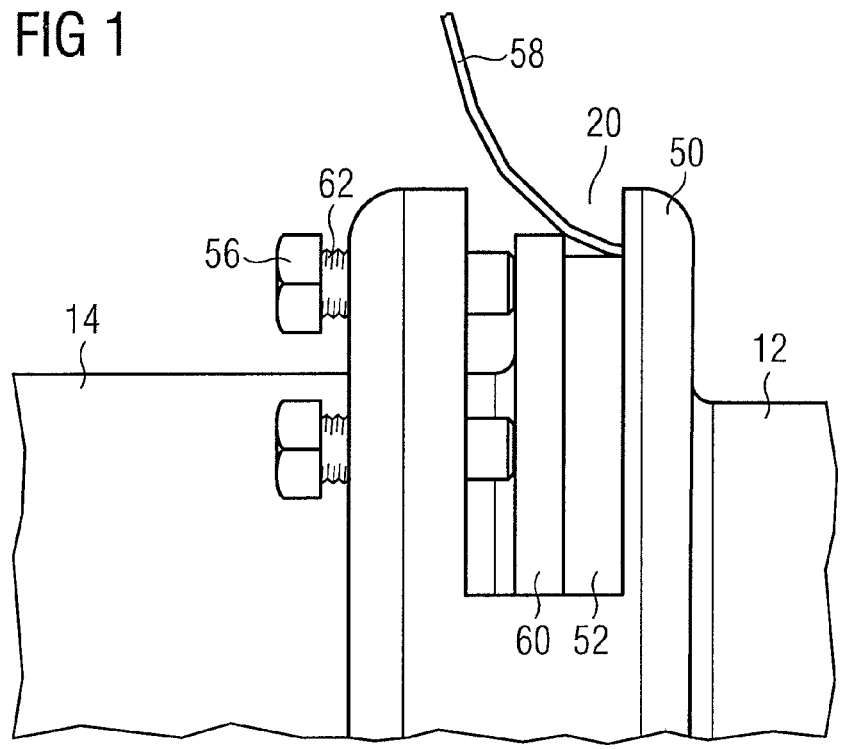
FIG. 1 shows a side-view of a burst disc assembly according to the present invention.

FIG. 1 shows a side-view of a burst disc assembly according to the present invention. A high-pressure conduit 12 leads from the cryostat, and terminates in a high-pressure flange, not visible in the drawing as it is housed within housing 50. A low-pressure conduit 14 forms part of an exit passageway providing a safe path for evacuation of expelled cryogen from the cryostat. The low-pressure conduit 14 terminates in a low-pressure flange 60. Housing 50 fits around and encloses the high- and low-pressure flanges. The housing may be made from two parts, respectively placed over the high- and low-pressure flanges and then joined together by any suitable conventional means (not illustrated), such as bolts, screws, rivets or welding. According to an aspect of the invention, sealing bolts 56 are provided in threaded through-holes, spaced at intervals around the housing 50. The sealing bolts are arranged to bear upon the low-pressure flange 60, and to drive it towards the high-pressure flange. A replaceable burst disc 52 is positioned between the low-pressure flange 60 and the high pressure flange. As the sealing bolts are tightened, the burst disc is compressed between the low- and high-pressure flanges, forming a gas-tight seal of the required quality to each flange. Preferably, the burst disc is provided with gasket seals on both faces, to assist in forming a leak-tight seal to each of the low- and high-pressure flanges. In preferred embodiments, a sensor 54 (not shown in FIG. 1 as it is housed within housing 50, but described in more detail below) connected to wires 58 may be provided, adjacent to the burst disc 52, to provide an indication of the state of the burst disc. The housing 50 includes an opening 20 large enough to allow the replaceable burst disc 52, and the sensor 54 to pass therethrough.

FIG. 1A shows a cross-section through the features of FIG. 1, taken through a plane which does not intersect opening 20. Sealing bolts 56 are shown loosened, with a newly inserted burst disc 52 and optional sensor 54 located between flanges 60 of the high-pressure conduit 12 and the low-pressure conduit 14. As shown in this drawing, the housing 50 includes a cavity 51 shaped and dimensioned so as to accommodate the flanges 60 of the high-pressure conduit 12 and the low-pressure conduit 14, the burst disc 52, optionally also a sensor 54, with a sufficient axial clearance 53 to allow the insertion and removal of a burst disc 52, optionally also a sensor 54. In particular, the axial dimension a of the cavity 51 is greater than the sum of the axial dimensions of the flanges 60, the burst disc 52 and any sensor 54 by an amount sufficient to provide clearance 53 to enable the insertion and removal of burst disc 52 and optionally also sensor 54. The diameter d of the cavity 51 is greater than the diameters e of each of the flanges 60, the burst disc 52 and any sensor 54 by an amount sufficient to provide clearance 55 to enable axial movement of flanges 60, the burst disc 52 and any sensor 54 within the cavity 51.

Following rupture of the burst disc, it is sufficient to loosen sealing bolts 56, extract burst disc 52 through opening 20 and replace it with a new burst disc, and re-tighten the sealing bolts 56. Any sensor 54 which may be present may be replaced at the same time, or separately, by following this procedure. Preferably, sealing bolts 56 and housing 50 are suitably dimensioned that the burst disc and sensor, if any, may be removed and replaced without the sealing bolts being completely removed from their thread. Replacement of the burst disc according to the present invention is accordingly rapid and simple. Equivalent fasteners may be used in place of bolts, for example quick release quarter turn fasteners, as will be apparent to those skilled in the art.

The present invention allows burst discs 52 to be installed and removed without separating the flanges, and requires minimal movement of the conduits 12, 14 and their associated flanges 60. In fact, the flanges need only be separated sufficiently to relieve pressure on the burst disc 52, and allow sufficient clearance for it to be removed and replaced through the opening 20. This idea allows the burst disc to be removed and replaced with minimal movement of the heavy conduits 12, 14.

This invention reduces the size and complexity of the current venting solution (a quench valve) allowing effective exit of cryogen gas from the cryostat in the event of a quench, yet still reduces the danger of air ingress and ice forming, due to the increased speed with which the burst disc can be replaced, and by operation of the optional sensor, as will be further discussed below.

Figure 2:
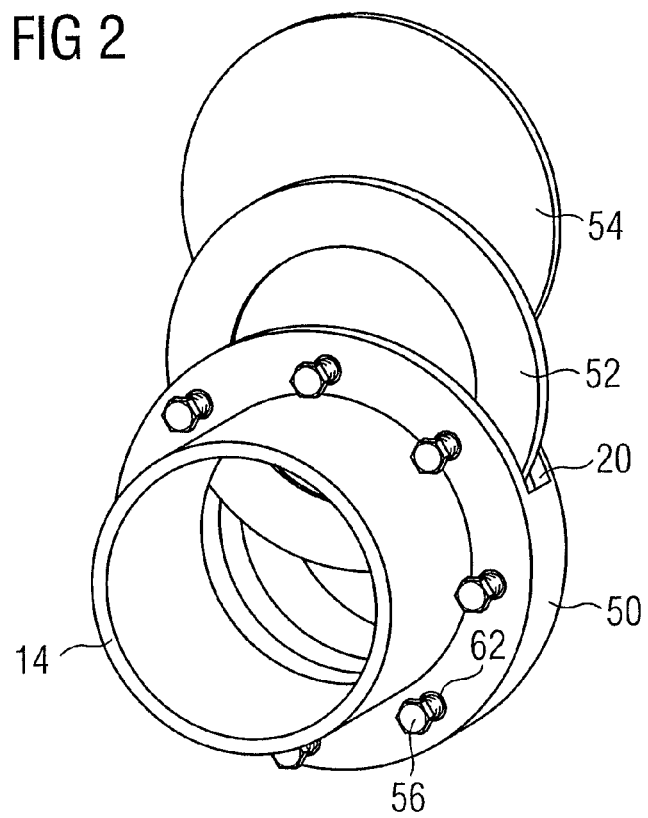
FIGS. 2 and 3 show a perspective view, and a side view, respectively, of a burst disc and a sensor being inserted into a housing, according to an embodiment of the invention.
Figure 3:
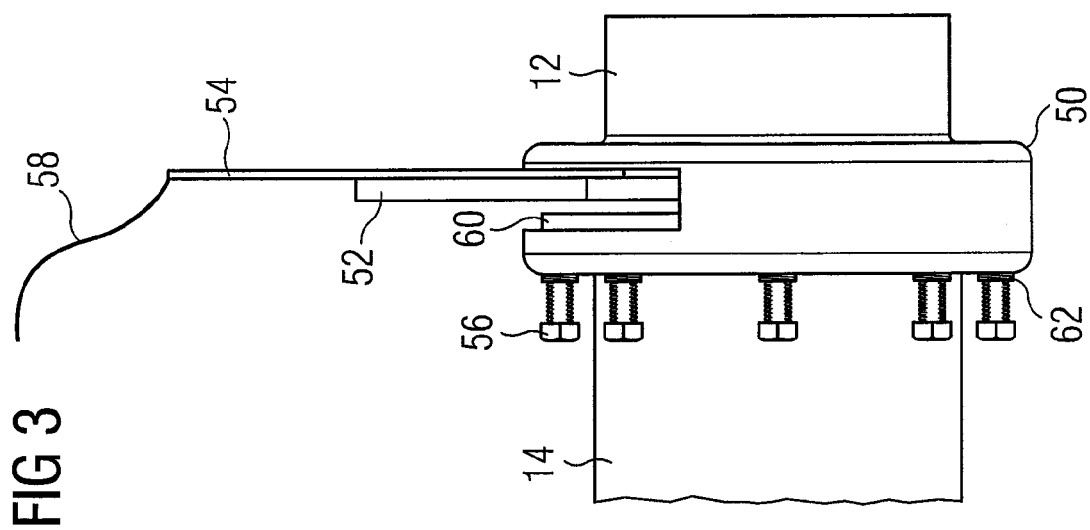

FIGS. 2 and 3 show how the burst disc 52 and sensor 54 are inserted into the housing 50, preferably from above although the housing 50 may be arranged with the opening 20 in any orientation, as convenient for the particular installation.

The burst disc 52, and optional sensor 54 if present, has gasket seals on at least one, and preferably each, face, so as to assist in forming a leak tight seal with the flanges when the flanges are urged together by the sealing bolts 56. A particular feature of the arrangement of the present invention is in that the sealing bolts 56 do not need to be removed fully in order to allow the burst disc 52 and any sensor 54 to be removed and replaced.

With the sealing bolts 56 in the position shown in FIG. 3, the low-pressure conduit 14 and its flange 60 can be pulled back, away from the high-pressure conduit 12 and its flange, and the burst disc 52 and optional sensor 54 can be inserted. The optional sensor 54 is shown here on the high pressure side of the burst disc 52, but could be fitted on either side of the burst disc.

After the burst disc 52 and any sensor 54 have been inserted into the housing 50, the sealing bolts 56 are tightened, which in turn forces the low pressure flange against the burst disc 52, compressing it against the high-pressure flange and forming a leak-tight seal to each flange as illustrated in FIG. 1.

The housing 50 with its opening 20 allows sensor wires 58 connected to the sensor 54 to exit the assembly without the need for an additional port.

Springs 62 may be added to the sealing bolts 56, in order to reduce the possibility of the sealing bolts 56 becoming loose due to vibration.

Quick release fasteners such as quarter turn fasteners may be used as an alternative to the sealing bolts 56 described. Other fasteners, well known in themselves to those skilled in the art, may alternatively be used.

Figure 4:
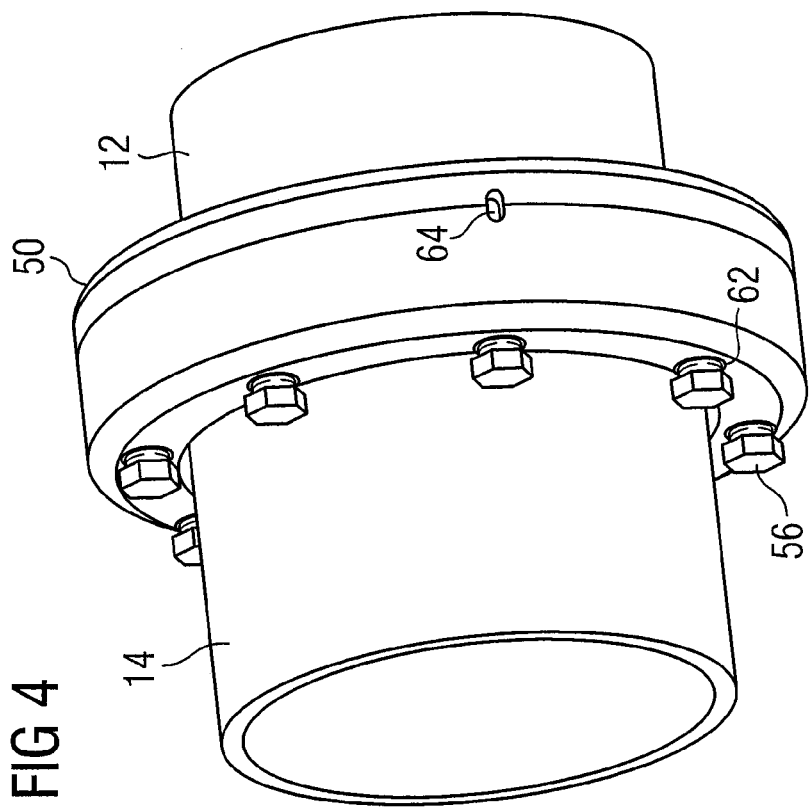
FIG. 4 shows the underside of the housing, with a removal hole, according to an embodiment of the invention.

FIG. 4 shows the underside of the housing 50, with a removal hole 64 placed diametrically opposite part of the opening 20 and allowing limited access to a surface of the burst disc. To enable a burst disc 52 to be removed easily, for example after it has ruptured, the sealing bolts 56 are slackened, and the burst disc 52 can be pushed out of the housing 50 using a screwdriver or similar implement, pushed through the removal hole 64.

An example of the use of the sensor 54 will now be described.

A compressor, for example a helium compressor where helium is used as the refrigerant, typically continues to operate despite a quench event having taken place, and a burst disc rupturing or a quench valve opening. This has the significant drawback that the refrigerator continues to cool the radiation shield. Once the quench event has expelled as much cryogen as it will and the refrigerator is still operating, the pressure within the cryostat may fall below atmospheric pressure, drawing air into the cryostat. This is very problematic, as air may freeze inside the cryostat, and can only be removed by raising the temperature of the whole system high enough for the air to turn back into gas. The magnet and the cryostat will then need to be cooled back to operating temperature, which will introduce significant delays, and may consume significant quantities of expensive cryogen. The sensor 54 is preferably arranged to detect the bursting of the burst disc, or other operation indicating the opening of an exit path from the cryostat, and in response to such detection, stopping the compressor and refrigerator. This will allow remaining cryogen within the cryostat to continue to boil off through the exit path, reducing the likelihood of air ingress into the cryostat.

Figure 5A:
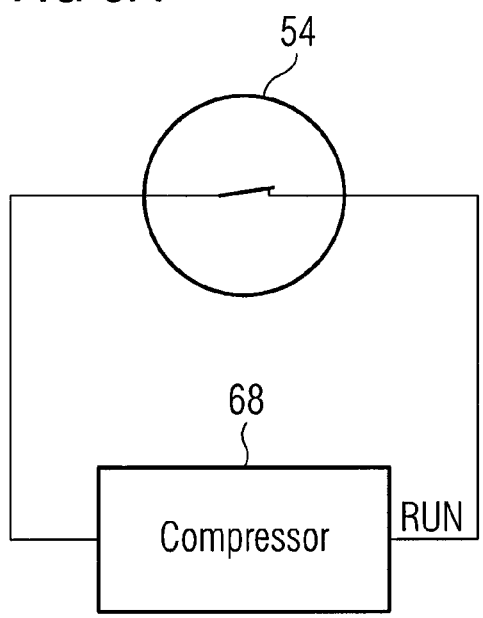
FIGS. 5A and 5B show electrical circuits illustrating an implementation of a protection circuit using a sensor, according to an embodiment of the present invention.

FIG. 5A shows an electrical circuit illustrating one possible implementation of a protection circuit using sensor 54, when the burst disc and its sensor are intact. In this example, the sensor is a normally closed switch. In other alternatives, the sensor may be a normally-open switch, or a sensor which changes in resistance, inductance, capacitance, voltage output, current output or any other property suitable for performing the function of a sensor. In the example illustrated in FIG. 5A, the sensor 54 is hard wired into a RUN signal for a compressor 68. When the sensor 54 is closed, that is, while the burst disc is intact, the compressor 68 will run. Suitable circuitry, well known to those skilled in the art, may be needed to adapt output signals from other types of sensor to make them suitable for controlling the compressor RUN signal.

Figure 5B:
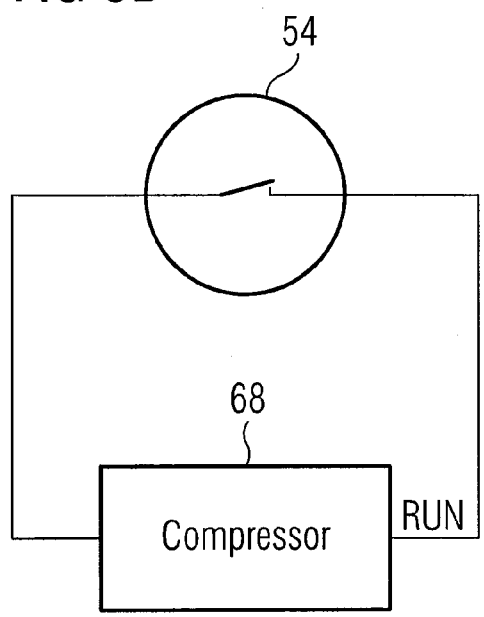

FIG. 5B shows the same electrical circuit when the burst disc has ruptured, and this change of state has been detected by the sensor. The sensor has become open circuit. As the sensor 54 is hard wired into a RUN signal to the compressor 68, the compressor will stop as the RUN signal will be lost.

While the installation and operation of the sensor 54, has been described in the context of the replaceable burst disc arrangement of the present invention, the sensor may be provided and employed to control compressors and refrigerators in conjunction with other burst disc arrangements, or even quench valve arrangements. This aspect of the present invention accordingly provides a sensor, arranged to detect the opening of a cryogen exit path and in response to such detection, to control the operation of a compressor and refrigerator which re-liquefies the helium gas and cools the radiation shields.

While the described embodiment has compression means 56 arranged to bear upon the low-pressure flange to force it towards the high-pressure flange, the invention may alternatively, or in addition, provide compression means arranged to bear upon the high-pressure flange to force it towards the low-pressure flange.

While the sensor(s) 54 have been described as articles separate from the burst disc itself, sensors may be built into the burst disc. For example, burst discs may be of conductive frangible material, such as carbon graphite-containing material. Such combined burst discs and sensors may usefully be applied in the present invention, but it is preferred that wires from the burst disc are led from the periphery of the burst disc, to provide ease of access and replacement.

While the present invention has been described with reference to conduits of circular cross-section and circular burst discs and sensors, the invention may be applied to conduits of any cross-section, with suitably shaped burst discs and sensors, if any. Reference to "disc", "diameter" and so on should be construed accordingly.

The invention claimed is:

1. A burst disc arrangement for a cryostat comprising a replaceable burst disc (52) held in compression between a high-pressure flange (60) formed at an end of a high-pressure conduit (12), and a low-pressure flange (60) formed at an end of a low-pressure conduit (14), characterised in that:

the burst disc arrangement further comprises:

a housing (50) enclosing the high- and low-pressure flanges (60), said housing (50) including a first opening (20) large enough to allow the replaceable burst disc (52) to pass therethrough; and compression means (56), distributed around the housing (50) and being arranged to bear upon at least one of the flanges (60), so as to urge it towards the other of the flanges, thereby retaining the burst disc (52) in compression between the low- and high-pressure flanges (60).

2. A burst disc arrangement according claim 1, wherein a sensor (54) is provided, adjacent to the burst disc, to provide an indication of the state of the burst disc.

3. A burst disc arrangement according to claim 1 wherein the housing (50) accommodates the flanges (60), the burst disc (52) and any sensor (54) within a cavity (51) shaped and dimensioned so as to accommodate the flanges (60), the burst disc (52), optionally also sensor (54), with a sufficient axial clearance (53) to allow the insertion and removal of a burst disc (52), optionally also a sensor (54).

4. A burst disc arrangement according to claim 3 wherein an axial dimension of the cavity (51) is greater than the sum of the axial dimensions of the flanges (60), the burst disc (52) and any sensor (54) by an amount sufficient to provide clearance (53) to enable the insertion and removal of burst disc (52) and optionally also sensor (54); and a diameter of the cavity (51) is greater than the diameters of each of the flanges (60), the burst disc (52) and any sensor (54) by an amount sufficient to provide clearance (55) to enable axial movement of flanges (60), the burst disc (52) and any sensor (54) within the cavity (51).

5. A burst disc arrangement according to claim 1, wherein the compression means comprises sealing bolts (56) in threaded through-holes spaced at intervals around the housing (50).

6. A burst disc arrangement according to claim 1, wherein the housing (50) includes a second opening (64), smaller than the first opening, placed diametrically opposite a part of the first opening (20), allowing limited access to a surface of the burst disc.

7. A burst disc arrangement according to claim 1, wherein the housing (50) is of two parts, respectively placed over the high- and low-pressure flanges (60) and joined together.

8. A burst disc arrangement according to claim 1, wherein the burst disc (52) is provided with a gasket seal on at least one face, in contact with a corresponding at least one of the low- and high-pressure flanges.

9. A method for replacing a burst disc in a burst disc arrangement according to claim 1, comprising the steps of:
  loosening the compression means (56) sufficiently to relieve pressure on the burst disc (52), and allow sufficient clearance for the burst disc to be removed and replaced through the opening (20);
  extracting the burst disc (52) from between the high- and low-pressure flanges and through the opening (20);
  inserting a replacement burst disc (52) through the opening (20) and between the high- and low-pressure flanges; and
  re-tightening the compression means.

10. A method according to claim 9 wherein the compression means comprises sealing bolts (56) in threaded through-holes spaced at intervals around the housing (50), and the sealing bolts (56) and housing (50) being suitably dimensioned that the burst disc may be removed and replaced without requiring the bolts to be completely removed from their thread.

11. A burst disc arrangement according to claim 2, wherein the sensor (54) is arranged to detect the bursting of a burst disc, indicating the opening of an exit path from a cryostat fitted with a cryogenic refrigerator operated by a compressor (68), arranged to stop operation of the compressor in response to such detection.

12. A burst disc arrangement according to claim 11, wherein the sensor (54) is of similar size to the burst disc, placed between the burst disc and one of the high- and low-pressure flanges, said sensor being removable and replaceable by a method comprising the steps of:
  loosening the compression means (56) sufficiently to relieve pressure on the sensor (54), and to allow sufficient clearance for the sensor to be removed and replaced through the opening (20);
  extracting the sensor (54) from between the high- and low-pressure flanges and through the opening (20);
  inserting a replacement sensor (54) through the opening (20) and between the high- and low-pressure flanges; and
  re-tightening the compression means.

13. A burst disc arrangement according to claim 11, wherein the sensor (54) provides on/off functionality, and which sensor is in a first state on installation, but which changes to a second, opposite, state in response to the bursting of the burst disc (52).

14. A burst disc arrangement according to claim 11 wherein the sensor is arranged to be linked to an alarm system for indicating the rupture of the burst disc to a user or a service organisation.

15. A burst disc arrangement according to claim 12, wherein the sensor (54) provides on/off functionality, and which sensor is in a first state on installation, but which changes to a second, opposite, state in response to the bursting of the burst disc (52).

16. A burst disc arrangement according to claim 12 wherein the sensor is arranged to be linked to an alarm system for indicating the rupture of the burst disc to a user or a service organisation.

17. A burst disc arrangement according to claim 13 wherein the sensor is arranged to be linked to an alarm system for indicating the rupture of the burst disc to a user or a service organisation.

* * * * *